United States Patent [19]

Pirlet

[11] 4,227,812

[45] Oct. 14, 1980

[54] METHOD OF DETERMINING A DIMENSION OF AN ARTICLE

[75] Inventor: Robert A. Pirlet, Embourg, Belgium

[73] Assignee: Centre de Recherches Metallurgiques Centrum voor Research in de Metallurgie, Brussels, Belgium

[21] Appl. No.: 884,151

[22] Filed: Mar. 7, 1978

[30] Foreign Application Priority Data

Mar. 10, 1977 [BE] Belgium .................................. 852371
Mar. 10, 1977 [BE] Belgium .................................. 852372

[51] Int. Cl.³ .......................... B01B 11/00; G01C 3/20
[52] U.S. Cl. ........................................ 356/372; 356/1; 356/387
[58] Field of Search ................................. 356/1, 4–5, 356/138, 152, 371–372, 375–376, 380, 386–387; 250/223 R–224, 231 SE, 561, 568

[56] References Cited

U.S. PATENT DOCUMENTS

| 3,016,464 | 1/1962 | Bailey | 356/1 |
| 3,234,844 | 2/1966 | Fain et al. | 350/6.6 |
| 3,857,637 | 12/1974 | Obenreder | 356/371 |
| 3,899,663 | 8/1975 | Pirlet | 356/376 |

FOREIGN PATENT DOCUMENTS 1175998 1/1970 United Kingdom ..................... 356/375

Primary Examiner—John M. Corbin
Assistant Examiner—Wm. H. Punter
Attorney, Agent, or Firm—Holman & Stern

[57] ABSTRACT

To determine a dimension of an article, a beam is directed at the article by means of a first mobile deflector so as to scan the part of the profile of the article comprising the dimension to be measured. Rays reflected by the article are orientated in the direction of at least one receiver by means of a second mobile deflector. The deflectors are angularly moved at different speeds. The positions occupied by two points related with the dimension are determined. The dimension is calculated with respect to these points.

3 Claims, 3 Drawing Figures

METHOD OF DETERMINING A DIMENSION OF AN ARTICLE

FIELD OF THE INVENTION

The present invention relates to an optical method of determining a dimension of an article, in particular the width of a flange of a section at the outlet of a rolling mill.

BACKGROUND OF THE INVENTION

Numerous optical methods exist which make it possible to measure the dimensions or sizes of articles, and in particular the dimensions of the cross-section of rolled sections by measuring distances and in general angles associated with such distances. The methods of this type involve sweeping or scanning the structural shape by means of the emission field under the action of at least one deflector which is being either rotated or displaced.

The applicant has already suggested, for example, a method in which radiation is directed at the section and a portion of the radiation sent back by the section is detected by means of a detector or receiver. The cross-section is scanned by means of a rotary deflector and the radiation being sent back is kept in the observation field of the receiver by synchronizing the orientation of the emitter and receiver axes.

The results obtained by these methods have proved very satisfactory and it has thus been possible to control not only the quality of a rolled product, but also the quality of the rolling operation.

However, it is generally desirable to increase the rapidity and accuracy of these measurements both for economical reasons and effectiveness of control. In practice, the rolling speeds are increasing and to control the product being produced it is necessary to effect measurements at increasingly higher speeds. Moreover, if one wishes to produce elongate products, measurements along the product should be repeated as frequently as possible so as to better locate zones in which there is a change from correct dimensions to dimensions outside permissible tolerances.

SUMMARY OF THE INVENTION

To avoid misunderstandings it should be noted that according to the present invention, to define one dimension, points are chosen which are related to the said dimension. In general, these points are two in number and define the ends of the said dimension. However, a dimension could also be defined by series of points and the projection onto a perpendicular to the surface on which the article rests of the distance between any one of the points of the first series and any one of the points of the second series could define this dimension. This is the case, for example, with the width of the flange of a section, in which the two essential points enabling to define it could comprise, on the one hand, a point situated at the upper end of the flange, and, on the other hand, a point situated on the web.

The present invention provides a method in which, on the one hand, a beam is directed on the article by way of a mobile deflector and the portion of the contour of the article comprising the dimension to be determined, is observed, and, on the other hand, the beam reflected by the article is orientated in the direction of at least one receiver by means of a second deflector, also mobile, the reflectors turn at different speeds of rotation, the positions occupied by these two points in relation to one of the dimensions to be measured are determined, and the dimensions related to these points are determined by a calculation method known per se.

Advantageously, the positions occupied by the reflectors are determined at least each time the beams reflected by the said two points energise the receiver or receivers.

The beams reflected by the article are preferably orientated in the direction of two receivers, one of which is designed to be energised by a beam from one of the two points related to a dimension to be controlled, and the other receiver is to be energised by a beam from the second point.

The axes of the emitter and of the receiver or receivers are advantageously disposed in the same plane. In the case in which a dimension of the cross-section of the article is to be determined, the plane in which the axes of the emitter and the receiver or receivers are contained is the same plane as that of the said cross-section.

Use is advantageously made of an optical-electronic unit acting as a receiver whose sensitivity is particularly high for detecting the beam reflected by the object. Such a receiver may be a simple optical-electronic unit, such as, for example a photo-multipler, an avalanche diode, a Schottky Barrier PIN photo-diode, or a silicon photo-diode.

The angular position of the first deflector may be determined by triangulation by means of an auxiliary system comprising a light source and a receiver comprising a plurality of photo-diodes.

The beam directed at the article has advantageously the shape of a directional beam, for example a laser beam, preferably limited by means of a diaphragm and focussed on the said article.

It is particularly advantageous to determine a minimum scanning zone and to restrict the scanning operation to the limits of the minimum zone, the minimum zone being restricted to the position of the article.

BRIEF DESCRIPTION OF THE DRAWINGS

With reference to FIG. 1, a rolled section 1, the width of whose flange 2 is to be measured, is located on a rolling track 3. To this end, the distances of points 4 and 5 with respect to a mirror 10 are measured, the difference existing between the projections of these distances on a perpendicular to the support 3 is computed, and the width of the flange 2 is thus obtained.

Figure 1:
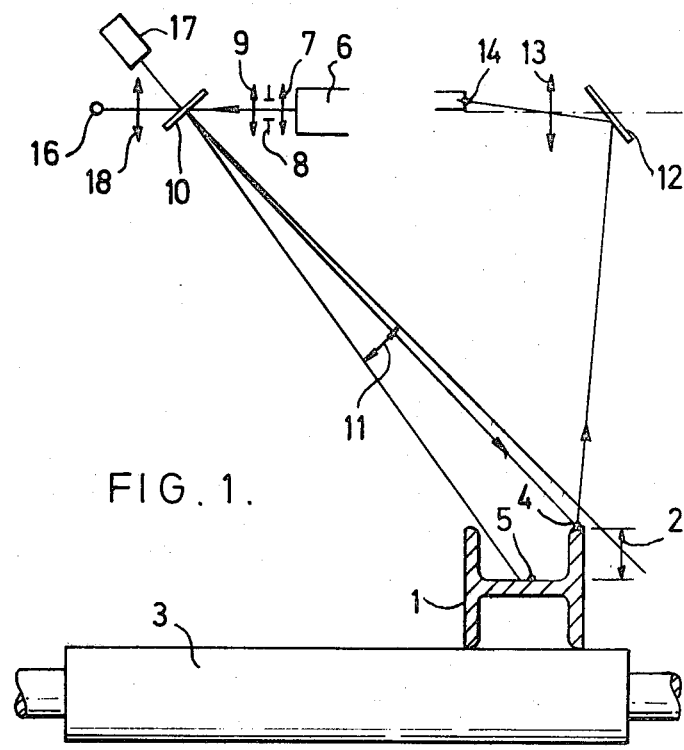
FIG. 1 diagrammatically illustrates an installation comprising a receiver formed by a photodiode whose optical axis is located in the plane of the cross-section of a rolled section.

A laser beam from an emitter 6 is focussed on a diaphragm 8 by means of an objective 7, the diaphragm 8 being designed to limit the beam so that its cross-section is well defined, the beam being then focussed on the cross-section of the rolled section 1 by means of a second objective 9. The laser beam is first projected on an oscillating mirror 10 which rotates about an axis perpendicular to the plane of the drawing. While the mirror 10 oscillates, the laser beam reflected by this mirror scans an angular field 11 in which the points 4 and 5 defining the width of the flange 2 are located. A portion of light reflected by the section is detected by a second oscillating mirror 12 which also rotates about an axis perpendicular to the plane of the drawing. From the mirror 12 the reflected beam is directed to a receiver (photo-diode) 14 after the beam has been focussed by an objective 13. It should be noted that the axis of the emitter 6 and the axis of the receiver 14 are located in the plane containing the cross-section of rolled section 1. Moreover, the axes of rotation of the deflectors 10 and 12 are fixed with respect to each other.

During scanning the beam reaches first point 4 and then the point 5 of the cross section, the respective positions of these points being successively detected by the receiver 14. It is then possible to determine the width of the flange 2.

To determine the angular position of the mirror 10, use is made of an auxiliary system comprising a light source 16 and receiver 17 formed by a plurality of photo-diodes. The beam from the source 16 is focussed by an objective 18 on the receiver 17 reached by the beam after the latter has met the mirror 10 which is a double-faced mirror. It is thus possible to determine with accuracy the angular position of the mirror 10 by triangulation. The reference numerals 1 to 14 in FIG. 2 indicate the same elements as those in FIG. 1. FIG. 2 also comprises a receiver 15 constituted by a second photo-diode. During scanning, the beam successively reaches the points 4 and 5, the position of the point 4 being detected by the receiver 14 while the position of the point 5 is detected by the receiver 15. The auxiliary system 16,17,18 shown in FIG. 2 performs the same function as in FIG. 1, i.e. it detects the angular position of the mirror 10.

Figure 2:
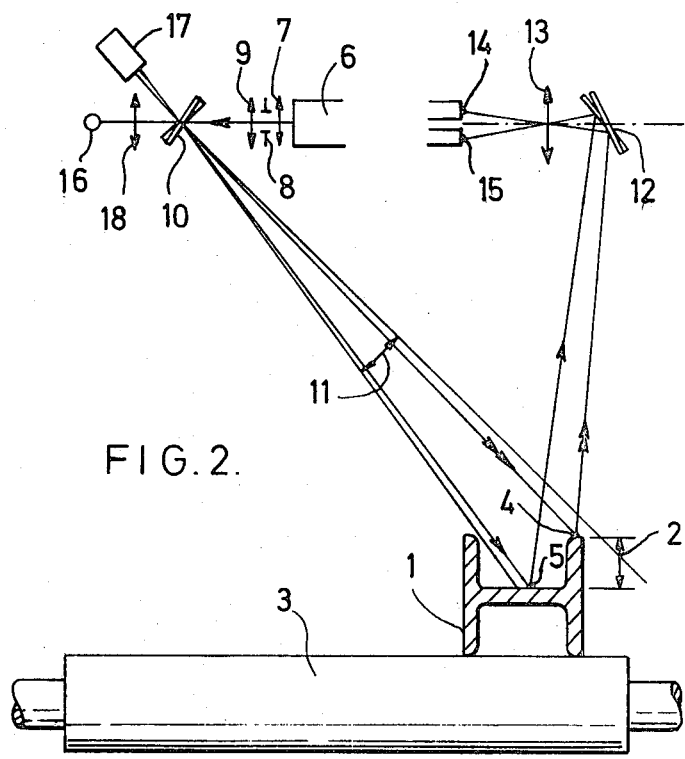
FIG. 2 diagrammatically shows an installation comprising a receiver formed by two photo-diodes, the optical axes of which are located in the plane of the cross-section of a rolled section.

The two-receiver system shown in FIG. 2 has a number of advantages with respect to the system with one receiver shown in FIG. 1. The mirror 12 rotates more slowly than the mirror 10. Consequently, to obtain data about points 4 and 5, several scans of the mirror 10 are indispensable while the mirror 12 slowly passes from position 4 to position 5, in the case in which only one receiver is used. Conversely, by using two receivers 14 and 15 it is possible to obtain, during a single scan of the mirror 10, data concerning the position of both points 4 and 5. This characteristic thus has the advantage of increasing the speed at which measurements are made.

Furthermore, during the time interval indispensable for scanning from point 4 to point 5, the structural shape may travel vertically. This results in a risk of alteration in the accuracy of the measurement. To minimise this risk, it is necessary to reduce as far as possible the time interval between detection of the two points 4 and 5. This further emphasises the advantage of such a detection by a single scan, i.e. the advantage of a two-receiver system.

The present invention also relates to a particularly advantageous modification of the invention in which the emitter and the receiver components are arranged in a particular manner one with respect to the other.

According to this modification, during the time taken by a deflector for scanning one of the various parts of the profile of the article, the other deflector completely scans the said parts of the profile of the article, and the optical members are arranged one with respect to the other in such a way that the beams reflected by each of the various parts of the profile of the article remain substantially at the same abscissa of the linear receiver during scanning of that part.

In the case in which a dimension of a cross-section of an article is measured, the optical components performing emission are located in the plane of the said cross-section and, on the receiving side, the axis about which scanning takes place and the orientation axis of the linear receiver are parallel to each other and intercept the emitter plane at two points located upon a straight line perpendicular to the plane of the base flange of the section.

In a particularly advantageous embodiment, the angle defined by the emission plane with the plane formed by the receiving members, i.e. the scanning axis and the orientation axis of the linear receiver, if 45°.

According to a second embodiment of this modification, two beams are simultaneously emitted, the axis of which form a known angle therebetween, and the two beams are directed towards the points upon the articles related to the dimensions to be determined so that when one of the two beams strikes one of the two points defining one dimension, the other beam strikes the second point.

According to another embodiment of this modification, the minimum zone of scanning is determined for each of the various parts of the profile of the article comprising the points defining the dimensions to be measured and the scanning is made dependent on the limits of each minimum zone, and the said minimum zones are made dependent on the position of the article.

According to a further modification, the minimum scanning zones are determined so that they are adjacent.

In the case in which the article may displace from its normal position, the position of the article is determined by triangulation by means of an auxiliary system comprising a receiver and a deflector. The auxiliary receiver advantageously comprises a plurality of photo-diodes on which the image of the cross-section of the article is formed, the position of the edges of the article corresponding to the end diodes of illuminated portion. The beam or beams emitted advantageously are directional beams, for example laser beams, preferably delimited by means of a diaphragm and focussed on the article by means of an objective. Focussing of the beam or beams on the article is effected at variable distances depending on the distance between the various parts of the profile of the article comprising the points defining the dimensions to be measured.

Figure 3:
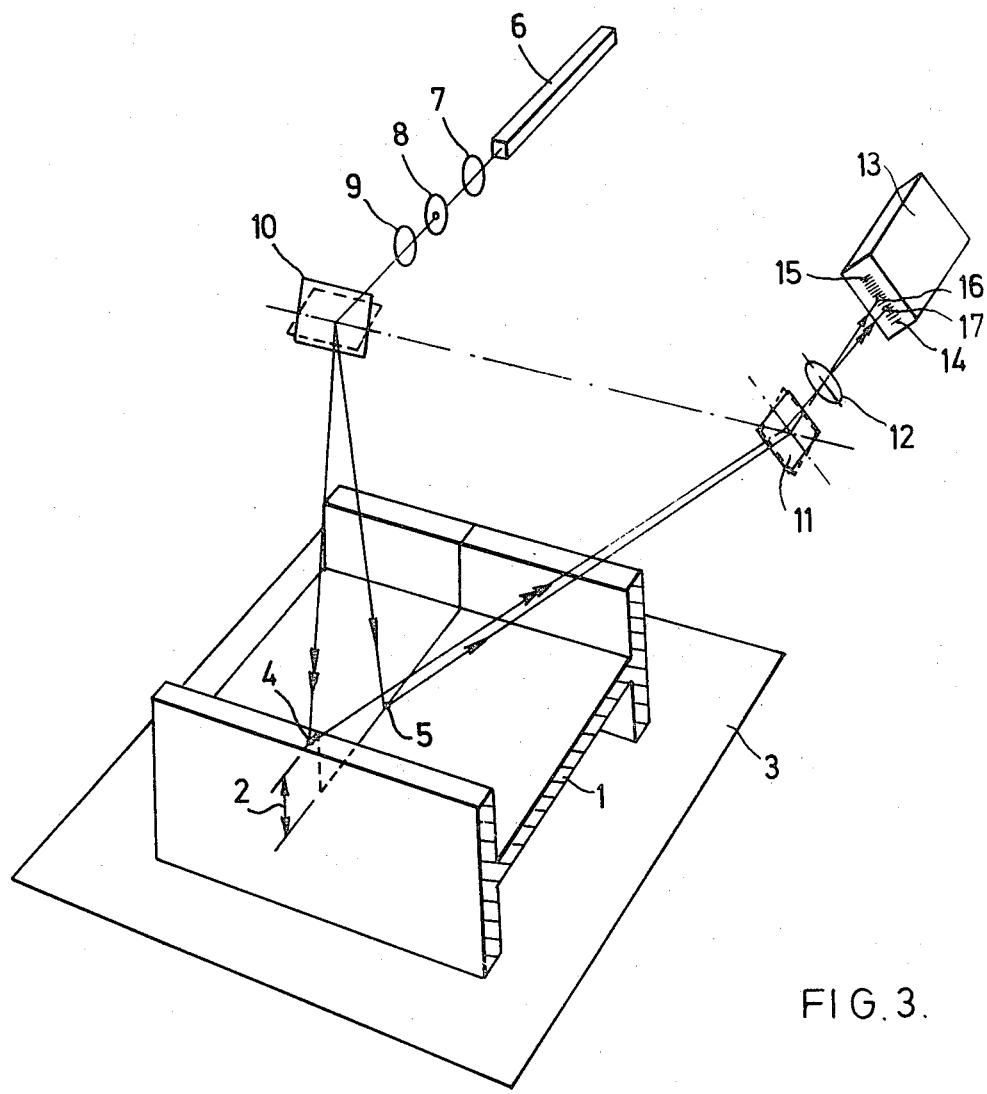
FIG. 3 diagrammatically illustrates a rolled section the flange width of which is to be measured by means of a laser beam.

As shown in FIG. 3, the section 1, the width 2 of the flange of which is to be measured, is located on a support 3. The width of the flange 2 is defined by a point 4 situated on the upper end of the base flange and by a point 5 located on the web of the structural shape of section 1. If the projections on a perpendicular to the support 3 of the distances of the points 4 and 5 with respect to a reference point are known, it is possible to determine the width of the flange 2 by subtracting these projections from each other.

From the laser emitter 6 a beam is directed to the objective 7 which focusses the beam on a diaphragm 8. Beyond the diaphragm, the beam whose cross-section is clearly delimited is focussed on the point 4 by means of an objective 9. Incidence of the beam on the point 4 is ensured by a mirror 10 whose movement is designed to scan, by means of the emitted beam, the upper end of the flange and a portion of the web comprising the point 5. The beam reflected by the point 4 is detected by the mirror 11, which directs it to the plurality of photodiodes 14, 15 of a receiver 13 after passing through a focussing objective 12.

While the mirror 10 slowly scans the upper end of the flange, the mirror 11 rapidly scans the same zone and the receiving members 11,12,13,14,15 are arranged in such a way that the beams reflected by the said upper end of the flange reach substantially the same zone 17 of the plurality of photo-diodes 14, 15 thereby producing more intense lighting of the diode 17 than the other processes, bearing in mind that the diodes 14, 15 are usually of rectangular shape the longer side of which is perpendicular to the axis 14, 15.

After scanning of the upper end of the flange, the emitted beam scans the part of the web having the point 5 on it. In the same way as for point 4, the beams reflected by the portion of web bearing the point 5 are directed to the same zone 16 of the plurality of photodiodes 14,15 thereby producing more intense lighting of the diode 16 than in other processes.

By knowing the positions of the diodes 16 and 17 as well as the mirrors 10 and 11 it is possible to determine the width of the flange 2 by triangulation.

The term "Linear receiver" as used in the present description should be understood as indicating a receiver one dimension of which, for example its length, is large with respect to another dimension, for example its width.

I claim:

1. A method of determining a dimension of an article, comprising directing a beam at the article by means of a first mobile deflector and scanning the part of the profile of the article comprising the dimension to be measured, orientating rays reflected by the article in the direction of at least one receiver by means of a second mobile deflector, angularly moving the deflectors at different speeds, determining the positions occupied by two points related with the dimension to be measured, and calculating the dimension with respect to these points;

wherein during the time taken by one of said deflectors to scan one of the various parts of the profile of the article, the other one of said deflectors completely scans all of the said various parts of the profile of the article, the optical members being arranged one with respect to the other in such a way that the rays reflected by one of the various parts of the profile of the article remain substantially at the same abscissa of the receiver during scanning of the said part of the profile.

2. The method of claim 1, wherein the dimension is a dimension of a cross-section of the article, the optical elements governing the emission are located in the same plane as the said cross section, and on the receiving side the axis about which scanning is effected and the axis of orientation of the linear receivers are parallel to each other and intercept the emitter plane at two points located on a straight line perpendicular to a plane containing the base flange of the section.

3. The method of claim 2, wherein the angle formed by the emission plane and the plane formed by the receiver elements defined by the scanning axis and the orientation axis of the linear receiver, is 45°.

* * * * *